Feb. 12, 1929.
G. W. YANSS
1,702,069
AUTOMOBILE BUMPER BRACKET
Original Filed Nov. 30, 1926
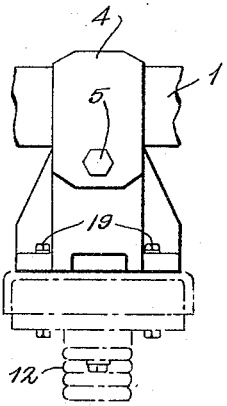
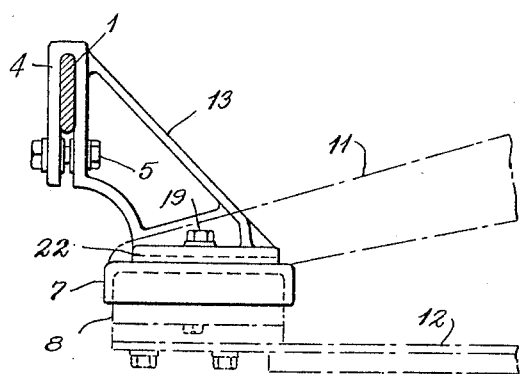
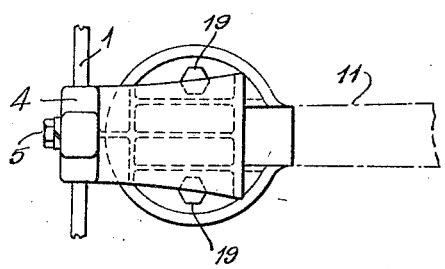
GEORGE W. YANSS, INVENTOR.
BY
Frederick S. Duncan, ATTORNEY.

Patented Feb. 12, 1929.

1,702,069

UNITED STATES PATENT OFFICE.

GEORGE W. YANSS, OF ADRIAN, MICHIGAN, ASSIGNOR TO AMERICAN CHAIN COMPANY, INC., A CORPORATION OF NEW YORK.

AUTOMOBILE BUMPER BRACKET.

Original application filed November 30, 1926, Serial No. 151,616, and in Great Britain October 18, 1927. Divided and this application filed January 13, 1928. Serial No. 246,444.

This invention relates to bumper brackets for automobiles of a type in which the frame carrying the body of the car has a horn with a socket member, provided with a flexible fabric cushion supported by the vehicle spring.

It is an object of this invention to provide a bumper bracket adapted to be attached readily to such a socket without drilling or special machining operations, and which is designed to co-operate also with the horn.

The bracket consists of a base for attachment to the socket and a rearwardly extending portion which straddles the horn. Mounted on the bracket is a clamp for holding a bumper bar.

A clear conception of the construction and further objects of this invention may be had from the following specification in conjunction with the accompanying drawing in which:

Fig. 1 discloses in front elevation the now preferred form of bracket embodying the invention, shown in place on the socket.

Fig. 2 is a side view of Fig. 1.

Fig. 3 is a plan view of Figs. 1 and 2.

The now preferred form of the invention consists of a base 22, shaped as shown in Figs. 1 and 2, having a clamp 4, formed in the end of its upright portion, to hold the bumper bar 1. The clamp 4 is provided with a bolt 5 for holding the jaws of the clamp about the bumper bar 1. A bracing member 13 is formed at the back of clamp 4 and is joined to the base 22. As already noted briefly, in the type of spring connection with which the improved bumper bracket is to be used, the horn is provided with a socket 7 containing the fabric cushion 8, which is bolted to the vehicle springs 12. The bracket base 22 is fastened to the socket 7 by suitable means such as a bolt or bolts 19 passing through the base 22, socket 7 and cushion 8. The bolts 19 are preferably original members of the cushion device thereby obviating the necessity of drilling new holes and providing new bolts for mounting the bracket.

In the form of this invention illustrated, the base 22 of the bracket 13 is made in the shape of a yoke or fork in order that it may straddle the horn 11.

This form of bracket constitutes a secure fastening for a bumper when used on an automobile having this particular type of fabric cushion. It is apparent, however, that other means of mounting might be used, such as by the provision of a plate secured between the horn and the vehicle springs upon which a similar bumper bracket might be mounted, in connection with the forms of automobiles not having a fabric cushion. It is to be noted that the form of bumper bracket herein illustrated forms the subject of generic claims in my co-pending application Serial No. 151,616, filed November 30, 1926, from which this present application has been divided.

I claim:

1. A bumper bracket for automobiles of the type in which the frame is provided with a horn having a socket formed thereon containing a fabric cushion connected with a vehicle spring, said bracket comprising a base having a yoke-shaped portion for co-operation with said horn, an upright portion having clamping means thereon for a bumper member, and means for connecting said base to said socket.

2. A bumper bracket for automobiles of the type in which the frame is provided with a horn having a socket formed thereon containing a fabric cushion connected with a vehicle spring, said bracket comprising a base having a yoke-shaped portion for co-operation with said horn, an upright portion having clamping means thereon for a bumper member, and means for connecting said base to said socket, said base having a pair of holes to receive bolts adapted to pass through existing holes in said socket.

In testimony whereof, I have signed this specification.

GEORGE W. YANSS.